United States Patent [19]
Wells et al.

[11] Patent Number: 5,742,421
[45] Date of Patent: Apr. 21, 1998

[54] SPLIT LENS VIDEO DISPLAY SYSTEM

[75] Inventors: Benjamin A. Wells, Lincoln; Bruce Johnson, N. Andover, both of Mass.; Donald Dilworth, East Boothbay, Me.

[73] Assignee: Reflection Technology, Inc., Waltham, Mass.

[21] Appl. No.: 609,729

[22] Filed: Mar. 1, 1996

[51] Int. Cl.[6] ..................................................... G02B 26/08
[52] U.S. Cl. .......................... 359/214; 359/210; 359/213; 359/215; 359/900
[58] Field of Search ........................ 359/197, 204, 359/209, 210, 212–215, 221, 225, 900; 250/578.1; 340/815.45; 345/7–8, 32, 82–83; 348/800–803, 739, 42, 51, 115

[56] References Cited

U.S. PATENT DOCUMENTS

| | | |
|---|---|---|
| 4,897,715 | 1/1990 | Beamon III ............................... 359/212 |
| 4,934,773 | 6/1990 | Becker . | |
| 5,023,905 | 6/1991 | Wells et al. ............................... 379/96 |
| 5,155,615 | 10/1992 | Tagawa ..................................... 359/213 |
| 5,325,386 | 6/1994 | Jewell et al. ............................ 359/214 |

*Primary Examiner*—James Phan
*Attorney, Agent, or Firm*—Lahive & Cockfield, LLP

[57] ABSTRACT

A miniature visual display has an optical lens system with at least two separated lens elements positioned to admit a scanning mirror between them. The scanning mirror is driven with an oscillatory motion causing an image of a light source which is reflected in the mirror to appear to sweep across the field of view of an observer looking into the system. The light source is typically a linear array of light-emitting diodes, and the diodes are controlled to emit light flashes in synchronism with the scanning mirror oscillation frequency to generate a virtual raster image. The two lens elements are selected and arranged so that the magnification power of the system is split between the lenses. A viewer looking into the system sees a virtual image apparently positioned at a comfortable viewing distance which is in uniform focus over the entire viewing area.

15 Claims, 4 Drawing Sheets

SPLIT LENS VIDEO DISPLAY SYSTEM

FIELD OF THE INVENTION

This invention relates to display systems and, more particularly, to a miniature full-page video display system.

BACKGROUND OF THE INVENTION

Advances in the miniaturization of electronic components have resulted in a steady decrease in the physical size of computers to the point where the visual display device is one of the largest components of the computer. However, in order to be relatively useful, a visual display must have resolution sufficient to display a full page of text and graphics. Therefore, commonly-used direct view display devices, such as cathode ray tubes and liquid-crystal displays, must be of sufficient size so that a user can comfortably view a raster scan array which can contain over 100,000 picture elements. When such direct view screens are reduced to pocket size, the image tends to become small and difficult to read easily.

Accordingly, much smaller display devices have been designed that provide a virtual image display that is comparable in resolution to larger direct view display devices. One such device is shown in U.S. Pat. No. 4,934,773, to Becker, which discloses a miniature display device that can be either hand-held or mounted on a head strap. This device uses a line of light-emitting diodes to generate a line image. The line image generated by the line of light-emitting diodes is collimated by a lens and reflected to the user's eye by an oscillating mirror. A dust tight window, located between the oscillating mirror and the user's eye, protects the user from contact with the rapidly moving mirror. As the mirror oscillates, the line image is "swept" to form a rectangular, rasterized image. By controlling the diodes in synchronism with the mirror oscillations, a virtual image can be generated that is easily viewable by a user. When the image of the center LED in Becker is perfectly collimated, for example, its image will appear to be "located" at infinity, which generally is a comfortable focus setting for viewing.

It is desirable that the Becker magnifying lens (collimating lens) have a substantially flat field. This can be accomplished by using conventional lens design methods. For example, the model P4 display, sold by Reflection Technology, 230 Second Avenue, Waltham, Mass., 02154, employs a relatively thick plastic lens located near the scan mirror, and a separate field flattener lens located closer to the LED plane. Such a flat field lens causes the rays from an LED at either end of the array, as well as the rays from the center LED, to be well collimated. It is not necessary, however, for the field to be perfectly flat. Since the human eye unconsciously accommodates to a slight misfocus, it is capable of discerning an image having a small amount of misfocus or field curvature. It has been experimentally found that a field curvature of up to 0.5 diopter is acceptable to most people. The prior noted P4 optical system, for example, has approximately 0.3 diopters of inward field curvature.

The position of the lens and/or LED array of the Becker display may be made adjustable to provide a limited amount of focus adjustment. It has been experimentally found that a virtual image location between infinity and 10 inches is comfortable for most people. Additional focus range can be provided by replacing the dust-tight window with a custom spectacle lens having additional power. In addition, the custom spectacle lens may incorporate cylinder power to correct for a specific user's astigmatism. The preceding discussion of field flatness, however, applies only to the vertical screen dimension. The horizontal dimension of the screen is created by motion of the mirror. The distance from the user's eye to the lens varies slightly as the mirror moves. However, since the rays from each pixel are approximately collimated, the image is not affected by these slight distance changes.

The device disclosed by Becker can be constructed to display various image sizes. It should be appreciated that different image sizes require varying mirror oscillation amplitudes. Moreover, it is extremely desirable for the user to be able to view the entire image at once without moving his eye relative to the display viewing window. This in turn necessitates that the mirror and lens be a certain minimum size that increases rapidly as the mirror oscillation amplitude increases. Consequently, there is a tradeoff in the size of the device and the size of the apparent image.

Another miniature display device, which appears to be smaller than the Becker device for a similar field of view, is shown in U.S. Pat. No. 5,155,651, to Tagawa. The Tagawa display device uses the same elements as the Becker display device except that the lens element is positioned between the user's eye and the oscillating mirror rather than between the light-emitting diodes and the mirror as in Becker. The Tagawa device may be designed to have a more compact construction that results from the lens being positioned between the oscillating mirror and the user's eye. This lens positioning, however, causes the virtual image to not be uniformly in focus over a significant position of the mirror scan. In the vertical image direction, the lens may be designed to have a flat field, similar to the Becker device. However, as the mirror oscillates, the optical distance between the light source and the lens varies and the image of the light-emitting diode array appears to move along an arc. If the optical system is adjusted to bring the array image into sharp focus at the center of the mirror's travel, the array will lie inside the focal plane of the lens at other positions in the mirror travel. The resulting virtual image will consequently be out of focus for all but a very small portion of the total scan cycle. This problem can be reduced by limiting the extent of the mirror oscillation angle, but this remedy, in turn, reduces the field of view. The Tagawa device is therefore not capable of displaying a large field of view, all of which is in sharp focus. The focus problem is not present in the system disclosed in the Becker patent because the collimating lens is always positioned such that the light-emitters are located at the lens focal point. The Becker configuration thus generates a virtual image located at infinity which can be comfortably viewed by many people, but is limited in its potential to be miniaturized.

Accordingly, there is a need for a miniature display device that has a wide field of view in uniform focus.

SUMMARY OF THE INVENTION

In accordance with the above, this invention provides a miniature display system utilizing an array of light-emitting elements, a two-part optical system and an oscillating mirror to generate a two-dimensional virtual image. The two part optical system includes at least a first lens positioned between the light-emitting elements and the mirror and a second lens positioned between the mirror and the user's eye. The first lens partially collimates LEDS by the light-emitting devices and the second lens magnifies the virtual image created by the oscillating mirror. Depending upon the relative positions and strengths of the lenses, the virtual image may appear at infinity or may appear at a shorter, easily viewable distance.

It is an object of the invention to provide a miniature display device having a wide field of view.

It is another object of the invention to provide a miniature display device which generates a uniform, sharply focussed image.

It is also an object of the invention to provide a miniature display device which can be made smaller than prior art units generating a uniform sharply-focussed image with a comparable field of view.

DESCRIPTION OF THE DRAWINGS

The foregoing and other objects and advantages of the invention will be appreciated more fully from the following further description thereof, with reference to the accompanying drawings wherein.

DESCRIPTION OF A PREFERRED EMBODIMENT

Figure 1:
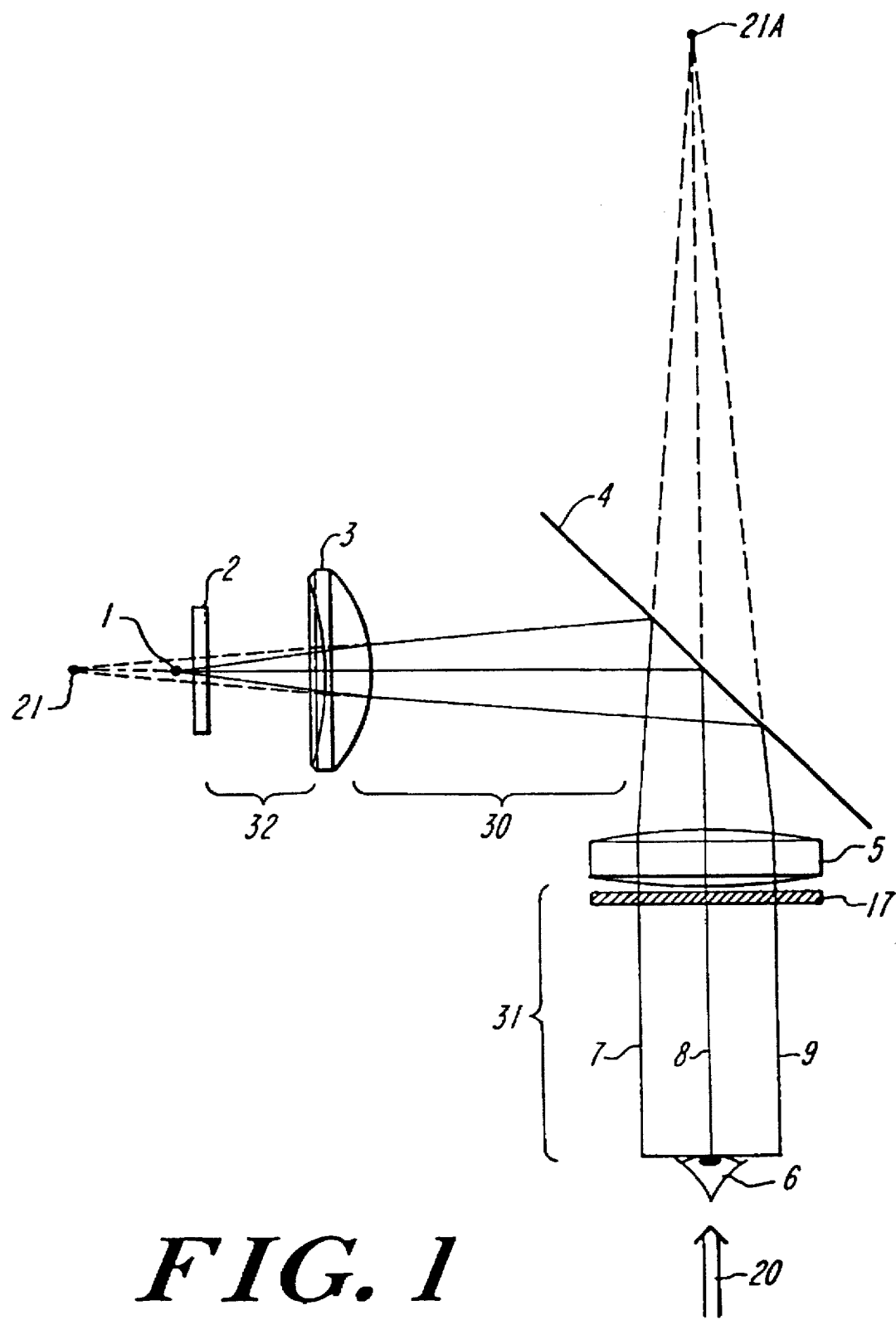
FIG. 1 is an illustration of a preferred embodiment of the invention, with the oscillating mirror positioned at the mid-point of its travel.

FIG. 1 shows a miniature display system having a linear array of light-emitting diodes 1 as its light source. The length of array 1, which is perpendicular to the plane of FIG. 1, preferably includes 256 individually controllable LEDS. A cover glass 2 may be positioned a short distance from the array 1 to protect the array 1 from any dust particles or other contamination that may be in the system.

The light generated by light-emitting diodes 1 is reflected from an oscillating mirror 4 to generate a virtual raster image in the manner described above. A first positive-power lens 3 is positioned between the oscillating mirror 4 and the array 1, and a second positive-power lens 5 is positioned between mirror 4 and viewing plane 6. Lenses 3 and 5 together act as a magnifier, forming a distant, virtual image (not shown) of the LED array. The distant virtual image may be viewed by an observer's eye, which is located at or near viewing plane 6. To the user, the distant virtual image appears to be a raster magnified image of array 1, located in front of the observer in direction 20. The vertical extent of the distant virtual image depends on the power of the lenses 3 and 5, and the vertical size of LED array 1.

More specifically, the distant vertical image is formed by first forming a first intermediate virtual image 21 of array. Virtual image 21 is formed because the angle between rays 7, 8, 9 in a space 30 (between lens 3 and mirror 4) is smaller than the angle between the rays 7, 8, and 9 in a space 32 between cover glass 2 and lens 3. For that reason, the rays would appear to emanate from first intermediate virtual image 21 to an observer located in the space 30.

Mirror 4 reflects first intermediate virtual image 21 to form second intermediate virtual image 21A which is located at or less than infinity. Second lens 5 acts as a magnifier by which second intermediate virtual image 21A may be viewed. In particular, the space 34 between lens 5 and viewing plane 6, rays 7, 8, 9 appear to emanate from a distant point located in front of the observer in direction 20. The rays 7, 8, 9 thus appear (to an observer at plane 6) to emanate from the distant virtual image of LED array 1.

Figure 2:
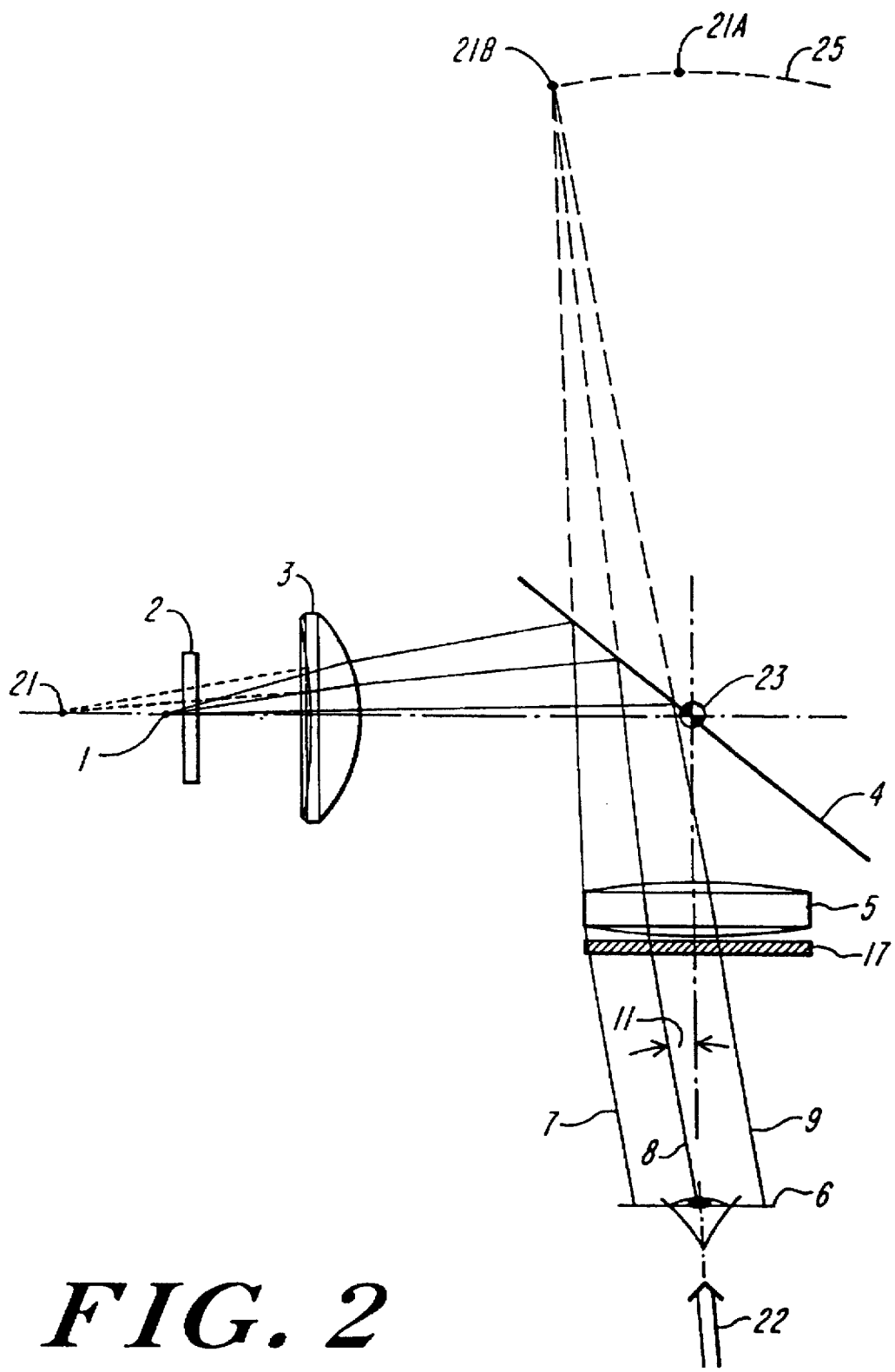
FIG. 2 shows the system of FIG. 1 where the oscillating mirror is positioned at one extreme of the useful portion of its travel.

In FIG. 1, the mirror 4 is located at the midpoint of its travel and the distant virtual image appears to lie in direction 20, which is essentially parallel to the optical axis of lens 5. In FIG. 2, mirror 4 is rotated through an angle about pivot axis 23. As a result, the distant virtual image of array 1 appears to lie in direction 22, at an angle 11 to the optical axis of lens 5.

Means are provided to rapidly change the angular position of mirror 4. In conjunction with the appropriate controlling hardware and software, the motion of mirror 4 is coordinated with the lighting of the individual LED's to create distinct graphic images as seen by an observer at plane 6. A more detailed description of the controlling hardware and software for driving the mirror and for illuminating the individual light-emitting device is disclosed in U.S. Pat. No. 4,934,773, to Becker, which is incorporated herein by reference.

As the mirror 4 oscillates, successive positions of the distant virtual image appear to follow arc path 25, centered about the rotation axis 23 of the mirror 4. Those portions are shown in FIG. 2 as reference numbers 21A and 21B. The radius of curvature of arc 25 is greater than the actual distance from the LBD array 1 to the rotation axis 23. This increased radius is due to the inclusion of the lens 5 in the optical system.

Because path 25 is curved, successive positions of distant virtual image 21A, 21B . . . will not all lie on the focal plane of lens 5, and thus will cause field curvature about the vertical axis. Increasing the distance from rotation axis 23 to the second intermediate virtual image, however, causes a significant reduction in the amount of field curvature. Indeed, if portions 21A and 21B, . . . were located at infinity (as is the case in U.S. Pat. No. 4,934,773) there would be no defocus effect as a result of mirror motion. In the present invention, however, the distance is not infinity, but the increased distance caused by inclusion of lens 5 significantly reduces any adverse defocus effect. As a result the image appears to be sharper and more nearly in focus over the entire field of the display. Another solution would be to move the second lens (5) in a longitudinal direction 40 along the second optical axis to vary the position and focus of the virtual image.

It should be appreciated that the above description is only accurate as a first order (paraxial) description. As such, it provides a simplified explanation of why the present invention offers better field flatness and sharpness than various configurations disclosed in the prior art. It has found experimentally that sharper images may be obtained than those using first order analysis. This assertion can be evaluated by reference to an actual ray trace of a preferred implementation. The preferred embodiment, for example, uses a lens prescription that spaces lens 3 to mirror 4 11.89 mm apart from each other. Spacing from mirror 4 to lens 5 is 24 mm. Distance from lens 5 to nominal viewing location 6 is 20 mm. Lenses 3 and 5 are made from commercial acrylic optical plastic with refractive index Nd=1.491. Lens 3 has first concave radius R1=38.18 mm on surface facing LED array and second convex radius R2=10.737 mm. Lens 5 has first convex radius R1=48.89 mm on surface facing mirror. Second surface R2 is a convex aspheric surface with base 'radius R2=71.05 ram, conic constant (cc)=4.969. Cover glass 2 is and is 1 mm thick BK7 optical glass, located 1 mm from LED array 1. Spacing from LED 1 to lens 3 is adjusted to place the distant virtual image at infinity.

Figure 3:
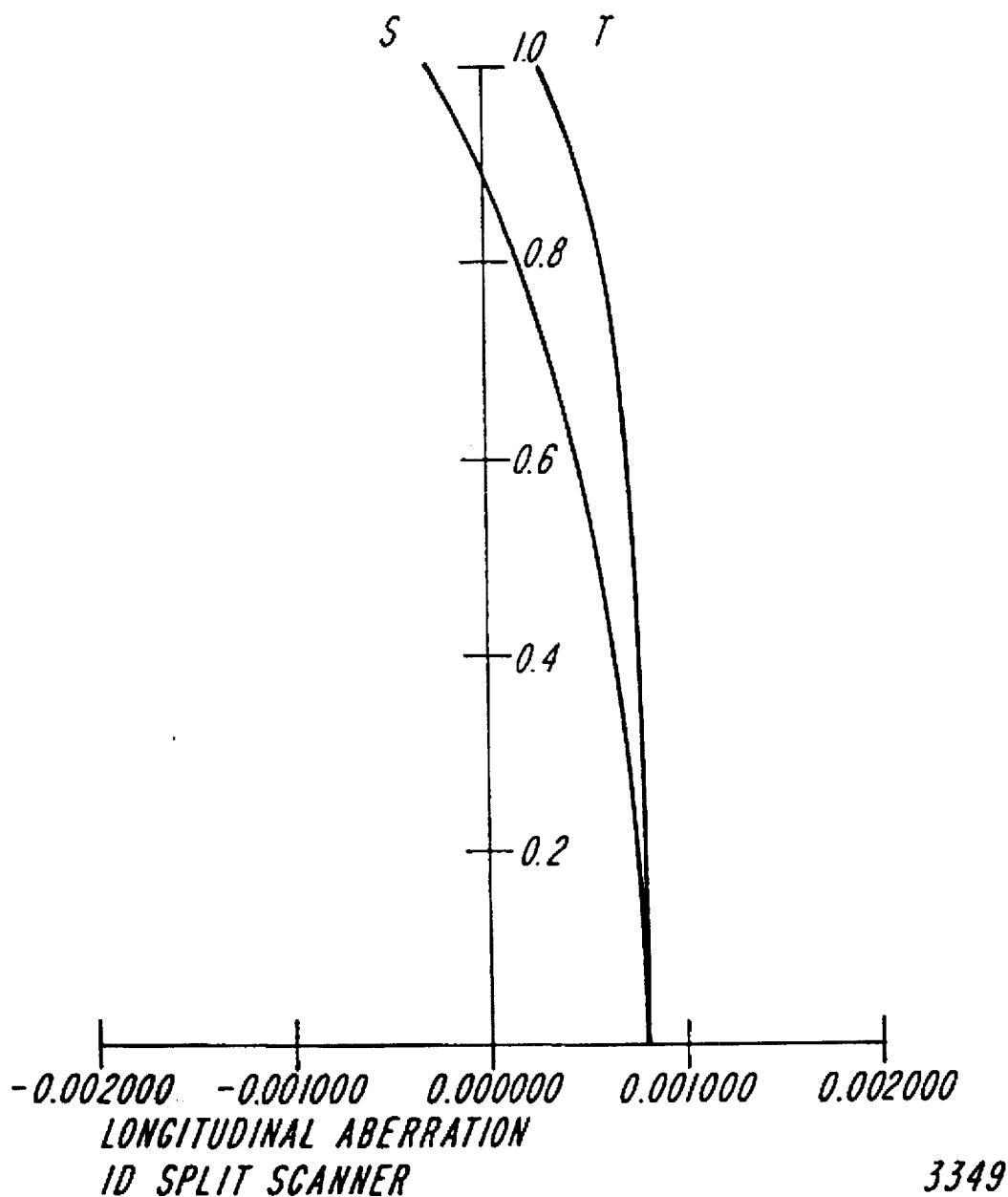
FIG. 3 shows astigmatic field curves corresponding to the mirror position of FIG. 1.
Figure 4:
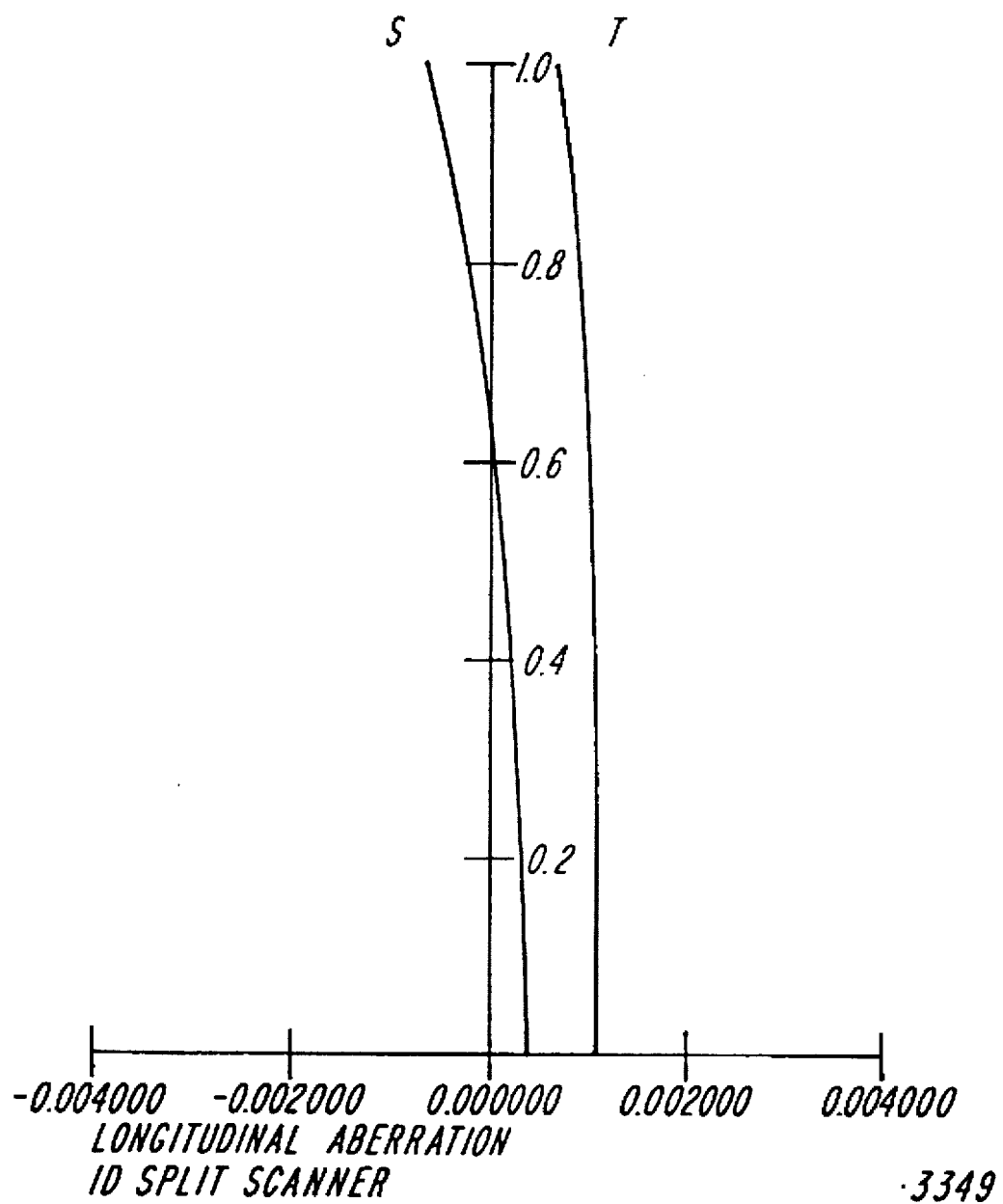
FIG. 4 shows astigmatic field curves corresponding to the mirror position of FIG. 2.

The results of the design advantages inherent in the immediate invention are shown in FIGS. 3 and 4. FIG. 3 shows the curvature of field of the preferred embodiment of the invention, where the ordinate of the plot is fractional field in the vertical position (along the direction of the array 1), and the abscissa of the plot is the angular blur radius of the image of a point that a user would see at that part of the field (assuming that the user's eye were able to capture all the light from the array 1 at each point in the field). The plot of FIG. 3 is taken in the case where the mirror 4 is at the center point of its travel, corresponding to the geometry shown in FIG. 1.

From FIG. 3, it is clear that the angular blur is somewhat larger than the angular resolution of the average human eye, which is typically about one arc minute, or 0.0029 radians. However, when consideration is given to the fact that, under typical conditions, the actual pupil of the eye is only about ⅓ of the total exit pupil size of the invention, however, the blur would therefore also be only about ⅓ of the size indicated in FIG. 3. It therefore follows that the invention generates an image with excellent sharpness.

FIG. 4 shows a similar set of data corresponding to the geometry shown in FIG. 2 where the mirror is positioned at one end of its travel. It can be seen that even in the worst case, the virtual image 15 is also well within the focal tolerance required to provide a sharp image.

A light filter 17 with a spectrum matched to the emitter spectrum may also be positioned adjacent to lens 5 to minimize the amount of stray light entering the system, where such stray light can reduce the contrast of the virtual image. It may be desirable to adjustably position LED 1 and/or lenses 3 and 5 so that the apparent distance of the distant, magnified virtual image may be adjusted to suit the viewing preference of an individual.

While the invention has been shown and described above with respect to various preferred embodiments, it will be apparent that the foregoing and other changes of the form in detail may be made therein by one skilled in the art without departing from the spirit and scope of the invention.

We claim:

1. An optical system for a display apparatus which has a size suitable for hand-held and headgear-mounted use and generates a raster image by reflecting light produced by an array of light emitting elements from an oscillating mirror to a user's eye and selectively illuminating the light-emitting elements as the mirror moves to create a substantially planar, two-dimensional enlarged virtual image, the system comprising:

a first positive power lens located between the light emitting element array and the mirror for creating a first intermediate virtual image of the light-emitting elements; the first lens having a first optical axis;

a second positive power lens located between the mirror and the user's eye for magnifying the reflection of the first intermediate virtual image; the second lens having a second optical axis; and the light-emitting element array, the first lens, the mirror, and second lens each being positioned relative to one another and relative to the viewer's eye so that the first lens and the second lens together generate a distant, magnified, virtual image at a comfortable viewing distance.

2. The optical system as defined in claim 1 further comprising a means for moving the second lens in a longitudinal direction along the second optical axis to vary the position and focus of the virtual image.

3. The optical system as defined in claim 1 wherein the first lens and the second lens are made from a plastic material.

4. The optical system as defined in claim 3 wherein the first lens has a concave surface that faces the plurality of light-emitting elements.

5. The optical system as defined in claim 1 wherein the total magnification in the optical system is split between the first lens and the second lens.

6. The optical system as defined in claim 1 wherein the virtual image is located at infinity and the first lens and the second lens together collimate the light emitted from the light emitting elements.

7. A miniature visual display system for displaying a magnified two-dimensional raster image that is viewable by a viewer's eye comprising:

an array of light emitting elements;

a first lens for creating an enlarged virtual image of the light-emitting elements;

a mirror for reflecting the enlarged virtual image to produce a reflection of the enlarged virtual image;

a means for repetitively moving the mirror through a predetermined range of movement;

a second lens for magnifying the reflection of the enlarged virtual image;

a means for selectively illuminating the light-emitting elements as the mirror moves to create a substantially planar, two-dimensional virtual raster image; and the light-emitting element array, the first lens, the mirror, and second lens each being positioned relative to one another and relative to the viewer's eye so that the first lens and the second lens together generate a virtual image at an apparent viewing distance at or less than infinity and provide the virtual image directly to the user's eye.

8. The display system as defined in claim 7 wherein the light emitting elements comprise light emitting diodes.

9. The display system as defined in claim 7 wherein the mirror comprises a planar mirror.

10. The display system as defined in claim 7 wherein the first lens and the second lens are positive power lenses.

11. The display system as defined in claim 7 further comprising a protective cover to shield the light emitting elements.

12. The display system as defined in claim 7 further comprising a means for adjusting the focus of the enlarged virtual image.

13. A miniature display system for displaying a substantially planar, magnified image comprised of a plurality of illuminated picture elements viewable by a viewer's eye, the display system being of an overall size suitable for hand-held use and comprising:

a plurality of light-emitting elements, each of which are capable of being independently illuminated to generate an illuminated pixel dot, the light-emitting elements being linearly aligned in at least one row;

a first lens for creating an enlarged virtual image of at least one row of the light-emitting elements;

a planar mirror, having a maximum dimension, in which the reflection of the enlarged virtual image is capable of being observed;

a means for resonantly oscillating the mirror about a fixed axis through a predetermined range of movement;

a second lens for magnifying the reflection of the enlarged virtual image;

a means for selectively illuminating the light-emitting elements so that a plurality of images of the light-emitting elements of the one row are generated at physically displaced points and a substantially planar, two-dimensional, virtual raster image is created; and the light-emitting element array, the first lens, the mirror, and second lens each being positioned relative to one another and relative to the viewer's eye so that the first lens and the second lens together generate a virtual image at an apparent viewing distance at or less than infinity and provide the virtual image directly to the user's eye.

14. A method for displaying an image in a display system that is directly viewable by a viewer's eye, the method comprising the steps:

(a) illuminating a plurality of light emitting elements that are aligned in a predetermined fashion;

(b) projecting light emitted from the plurality of light-emitting elements through a first positive lens to create an enlarged virtual image of the light-emitting elements;

(c) reflecting the virtual image from a planar mirror to produce a reflected virtual image;

(d) repetitively moving the mirror through a predetermined range of movement to create a two-dimensional raster display;

(e) magnifying the reflected virtual image by projecting the reflected virtual image through a second positive lens; and (f) positioning the light-emitting element array, the first lens, the mirror, and second lens relative to one another and relative to the viewer's eye so that the first lens and the second lens together generate a virtual image at an apparent viewing distance at or less than infinity and provide the virtual image directly to the user's eye.

15. The method as defined in claim 14 comprising the further step of:

(g) color filtering the reflected virtual image after it passes through the second positive lens.

* * * * *